INVENTORS:
HENRY V. SAX
HOWARD V. DRESSLER
BY: Oswald H. Milmore
THEIR ATTORNEY

Patented May 26, 1953

2,639,822

UNITED STATES PATENT OFFICE 2,639,822

PNEUMATIC LIFTING AND ROTATING MACHINE

Henry V. Sax and Howard V. Dressler, Martinez, Calif., assignors to Shell Development Company, San Francisco, Calif., a corporation of Delaware Application April 22, 1949, Serial No. 89,086

5 Claims. (Cl. 214—1)

This invention relates to machines for lifting and rotating articles such as metal cylinders used for storing gas under pressure, and is applicable for handling other articles, such as bottles, pipes, barrels, drums, etc. More particularly, the invention relates to a machine for raising an article and rotating the article in accordance with the raised or lowered position of the article.

The specific embodiments described are intended to handle elongated metal cylinders or drums to permit spray painting, and are constructed to raise the cylinder or drum and rotate it automatically when it has been lifted to a predetermined distance from the base, such rotation being continued so long as the cylinder or drum is elevated; the machines stop the rotation automatically when the cylinder or drum is lowered. The invention may, however, be also embodied in other arrangements wherein the rotary motion is arranged differently in relation to the vertical position of the cylinder or other article, depending upon the purpose for which such article is to be lifted. Further, the invention will be described with reference to a device for lifting a cylinder or drum initially resting on a base, such as a conveyor system, by engaging the top thereof and suspending it pendulously or by pushing it up; it will be understood, however, that the invention may also be applied to other installations, e. g., where some other part of the cylinder or other article is engaged.

Various mechanical expedients have been proposed for performing the operations of lifting and rotating objects. Some have employed automatic sequence devices such as cam-actuated electrical switches or fluid valves which have been complex and expensive to install and maintain. Others have depended upon manual operation.

It is an object of the invention to provide a simplified pneumatic device for carrying out the translation and turning operations automatically in a desired sequence. A further object is to provide a device employing but a single control valve which may, for example, be operated by an operator or by an automatic trip operated by the article to place the machine into operation and may be again operated either by the operator or by a timing device to stop the rotation and return the device by translatory motion to its starting position.

A specific object is to provide a spray painting aid comprising an engaging device for securing a cylinder or drum to be painted and provided with pneumatic lifting and rotating motors supplied with air through a single conduit and arranged to raise the engaging device without initial rotation and to rotate it after it has been raised a distance sufficient to lift the engaged cylinder clear of its support and continue such rotation for any desired time to permit the cylinder or drum to be spray painted on all sides, the motors being arranged to stop the rotation when the air supply to the motors is shut off and the lifting device being arranged to lower the engaging device while the latter is no longer rotating.

In summary, according to the invention the article lifting and turning machine comprises a fixed supporting member; a movable supported member connected to the former by pneumatically operable means, such as a bellows or piston and cylinder means, for imparting translatory motion to the supported member in a desired direction, e. g., vertically upwards, in opposition to some force, such as gravity, when pneumatic pressure is applied; a rotor on the supported member adapted to supportingly engage an article; pneumatically operable means, such as a pneumatic motor, for turning the rotor with respect to the fixed supporting member; and pneumatic conduit means for supplying pneumatic pressure to the two pneumatically operable means; and a valve for controlling the admission of pneumatic fluid to the means for turning the rotor controlled by the linear position of the supported member. In the most practical application the rotor is rotatable with respect to the supported member and the latter is constrained against rotation with respect to the supporting member, e. g., secured by a slide or key to have only linear motion; the invention is not, however, in every case limited to such a construction.

In the preferred embodiment a piston and cylinder are used to effect translatory motion of the supported member and rotor, the cylinder having a port in its side connected to the pneumatic motor and located to be uncovered by the piston so as to place the motor into communication with the source of pneumatic pressure after the desired translatory motion has been effected.

The invention will be described in greater detail with reference to the accompanying drawings forming a part of this specification, wherein.

Figure 1:
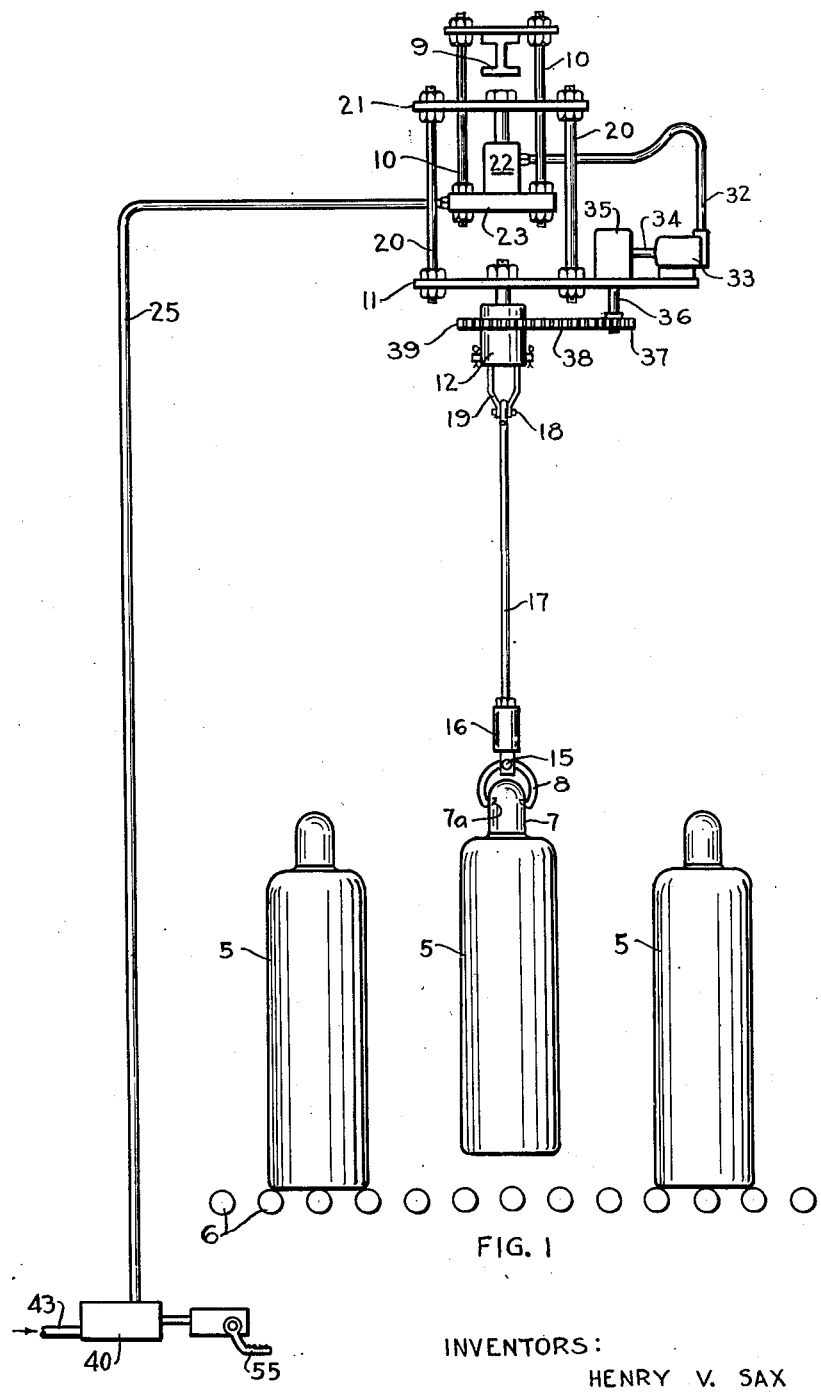
Figure 1 is an elevation view of the machine installed for spray-painting of pressure gas cylinders in elevated position.
Figure 2:
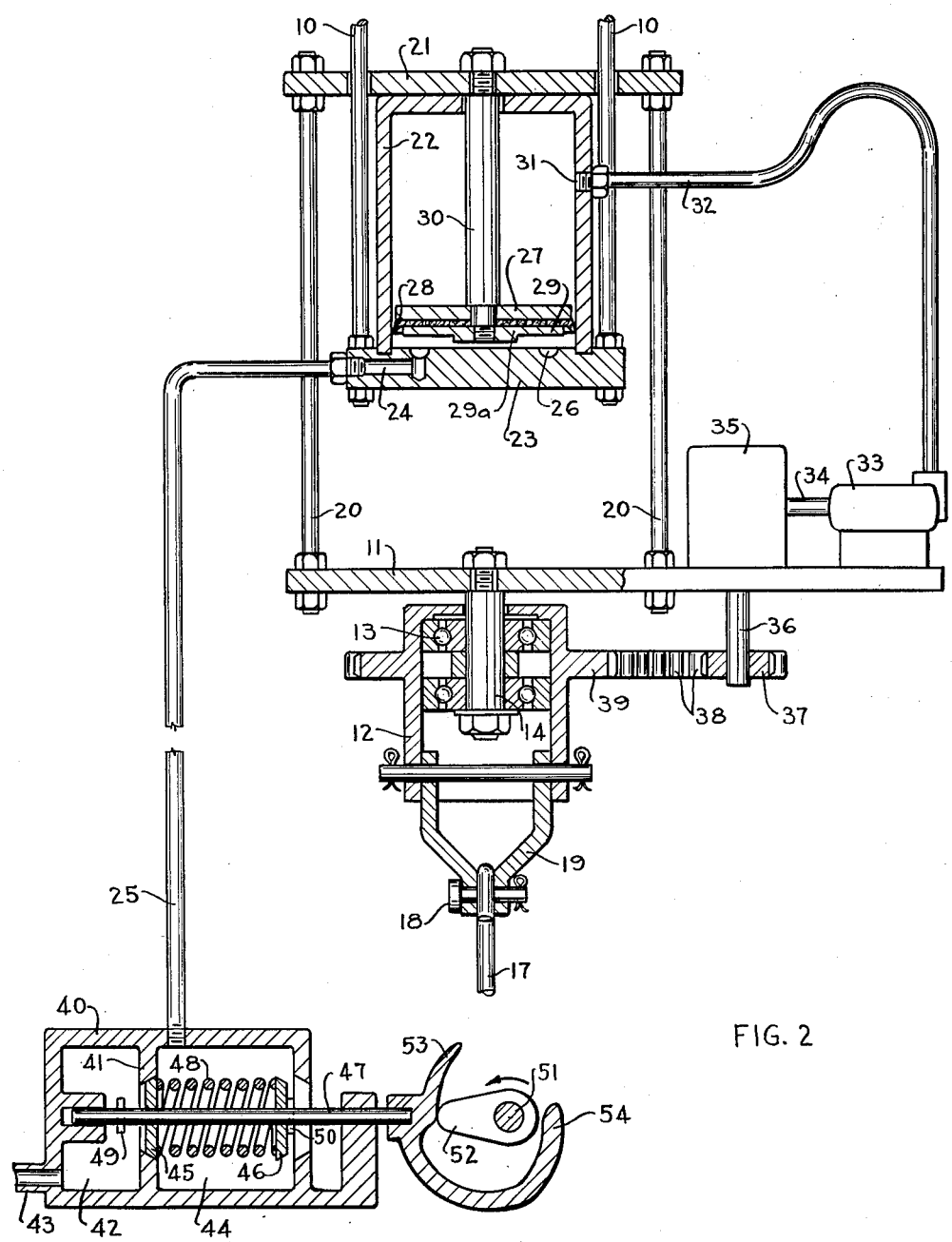
Figure 2 is an enlarged, fragmentary view of the operating mechanism with the movable support in its lower position.

Referring to Figures 1 and 2, the machine is shown as applied for handling cylinders 5 of the type used to contain gas, such as ammonia, butane, etc., under pressure. They may be advanced in upright position on a conveyor having rollers 6. Each cylinder has a cap 7 of conventional design and provided with indentations 7a by which it may be gripped by tongs 8.

The lifting machine is supported from an overhead girder 9 and comprises: a fixed supporting member, shown as a pair of hanger rods 10 suspended from the girder; a vertically movable supported member, shown as a platform 11; a rotor 12 rotatably mounted on the platform 11 through anti-friction rollers 13 carried on a spindle 14; and an article-engaging member, shown as the above-mentioned tongs 8, which are hinged at 15 on an adjustable clevis 16 carried by a hanger rod 17, the upper end of which is pivotally supported at 18 between plates 19 carried by the rotor.

The platform 11 has bolted thereto uprights 20 fixed at their upper ends to a plate 21. A cylinder 22 is fixed to the hanger rods 10, which extend slidably through holes in the plate 21. The bottom of the cylinder is closed by a bolted plate 23 having a passageway 24 for the admission of pressure fluid via a conduit 25 from a source of pressure, not shown. An annular groove 26 on the upper face of the cylinder bottom communicates with the passageway 24. A piston 27 is provided within the cylinder and has leather or similar sealing means 28, retained by a plate 29 having a central boss 29a preventing the bottom of the piston from lying flat against the plate 23. The piston is fixed to the plate 21 by a piston rod 30 extending through a hole in the upper end wall of the cylinder. It is not necessary to provide packing between the piston rod and upper end wall because pressure fluid is confined below the piston. A port 31 in the side of the cylinder and spaced from the top by a distance exceeding slightly the height of the piston, is connected by a flexible hose 32 to a pneumatic motor, such as a high speed bladed motor 33 mounted on the platform 11. The output shaft 34 of the motor is connected to a worm reducing gear 35 the vertical output shaft 36 of which extends through the platform and carries a sprocket 37. A chain 38 meshes with this sprocket and with a larger sprocket 39 fixed to the rotor 12.

The conduit 25 is connected to a two-way valve 40 which may, if desired, be mounted at the ground for foot operation. It comprises a housing with a partition 41 dividing the housing into a high pressure chamber 42 into which air under pressure e. g., 40-100 lbs. per sq. in., may be admitted via a conduit 43, and a controlled pressure chamber 44 in communication with conduit 25. A pair of valves 45 and 46, slidably mounted on a reciprocable shaft 47 and urged apart by a coiled spring 48, cooperate with ports in the partition and in the end wall of the chamber 44. Fixed stops 49 and 50 on the rod unseat one or the other of the valves, placing the chamber 44 selectively into communication with the high pressure chamber 42 or with the atmosphere. The shaft 47 may be actuated by any means, known per se, such as a ratchet-advanced, treadle-actuated shaft 51 having a lever 52 engageable with abutments 53 and 54 on the shaft 47, and rotated 180° each time treadle 55 is depressed. It will be understood that when the shaft 51 is rotated in a counter-clockwise direction from that shown in Figure 2, the lever 52 moves off the abutment 53, permitting the spring 48 to close the valve 46. Continued rotation causes engagement of lever 52 with abutment 54 and opening of the valve 45, thereby connecting the conduit 25 to the high pressure line 43.

*Operation*

Valve 46 being open and valve 45 closed, the system is initially vented to the atmosphere and in the position shown in Figure 2. A cylinder 5 is moved on rollers 6 beneath the tongs 8 and engaged thereby by hand. Shaft 51 is rotated 180° counter-clockwise by stepping on treadle 55, thereby opening valve 45 and admitting air under pressure via conduit 25, passageway 24 and groove 26 into the cylinder 22 and raising the piston 27, plate 21, uprights 20, platform 11, rotor 12 and the cylinder 5, to provide floor clearance for the cylinder as shown in Figure 1. When the lift has reached a maximum the port 31 is uncovered by the piston, the port and piston acting as valve means to admit air through hose 32 to the motor 33. This drives the worm gear 35, sprockets 37 and 39, causing the rotor 12, hanger rod 17 and the cylinder 5 to rotate, permitting the cylinder to be spray painted.

When the painting has been completed the shaft 51 is again advanced counter-clockwise through 180°, thereby shutting off the high pressure air and venting the cylinder 22 and conduit 25 to the atmosphere. The motor 33 immediately stops turning the rotor and the piston 27 and parts supported thereby descend. The cylinder 5 is then manually disengaged from the tongs 8 and moved along the conveyor.

Figure 3:
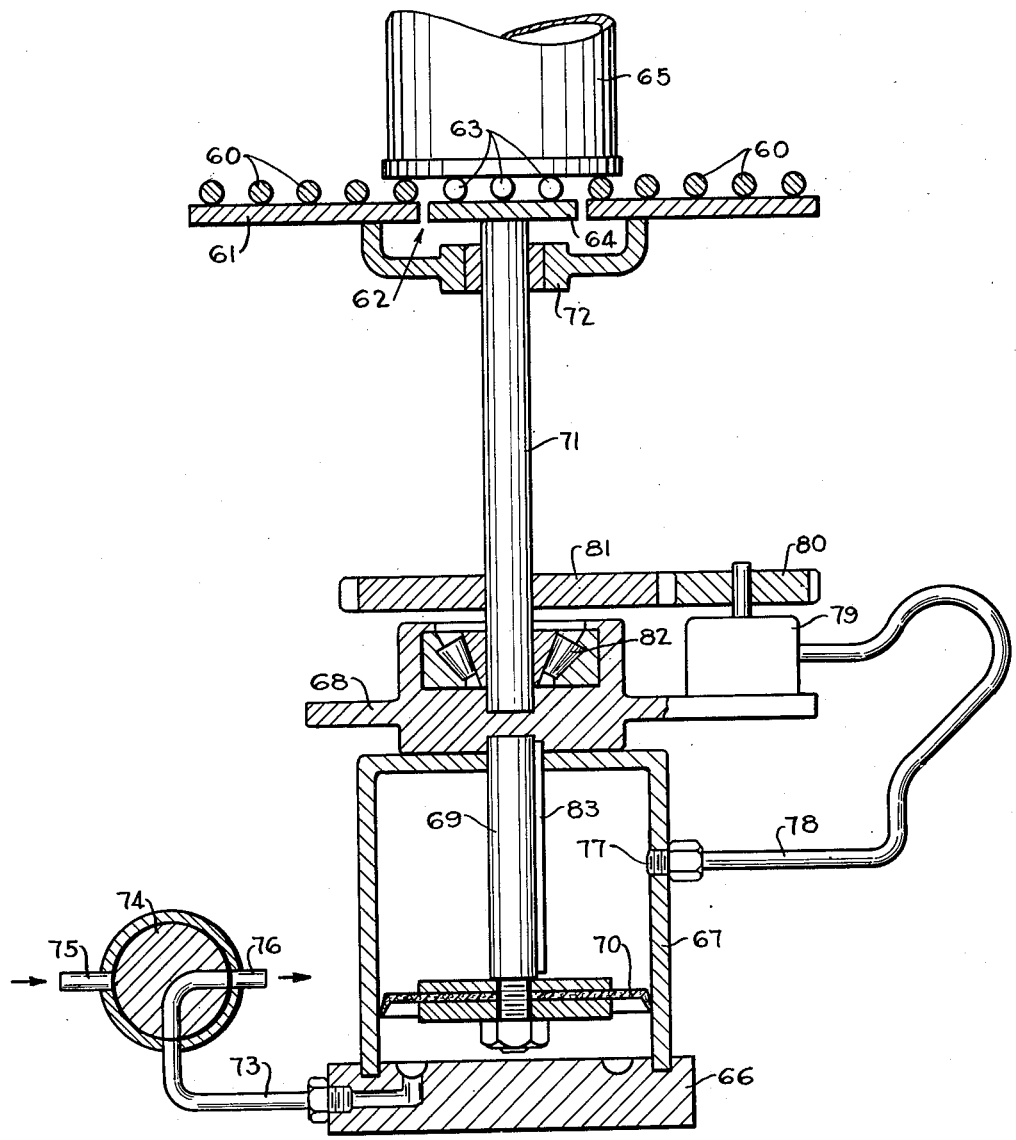
Figure 3 is an elevation view, partly in section, of a modified embodiment suitable for drums or barrels.

In the modified arrangement shown in Figure 3 the conveyor comprises rollers 60 disposed over a floor 61 having a hole 62. Partial rollers 63 provide an opening for a movable article-engaging platform 64, whereby an article such as a drum 65 may be moved to a position over the hole and platform.

The device comprises a fixed support 66, forming the end wall of a cylinder 67; a vertically movable support 68, carried by the piston rod 69 which is fixed to the piston 70; and a rotor shaft 71, rotatably mounted on the support 68 for supporting and turning the platform 64 and journalled in a sleeve 72 supported by the floor 61. The cylinder 67 communicates with a conduit 73 connected to a two-way valve 74 for selectively admitting high pressure air through conduit 75 from a source (not shown) or venting air through outlet 76. A port 77 in the cylinder wall near the top is connected through a flexible hose 78 to an air motor 79 mounted on the support 68. Pinion 80 on the motor shaft meshes with gear 81 on the rotor shaft 71 for rotating the latter and the platform 64. The shaft 71 is axially supported in tapered bearings 82 on the movable support 68, while the latter is prevented from turning with respect to the cylinder 67 by means of a rib or key 83 on the side of the piston rod 69, which cooperates with the upper wall of the cylinder.

The operation of the device is similar to that of the previous embodiment, save that the drum 65 is pushed upwards instead of being suspended. Thus, when a drum has been maneuvered over the platform 64, the valve 74 is turned to admit high pressure air into the cylinder; this raises the piston 70, and port 77 is uncovered when the piston is near the top of its travel. This, in turn, admits air to the air motor 79, causing the raised platform 64 and drum 65 to rotate. When the valve 74 is again turned to the position shown in the drawing the rotation stops and the air is vented, permitting the platform 64 and piston to descend.

We claim as our invention:

1. A pneumatic article lifting and turning device comprising, in combination, a supporting member; a supported member movably mounted on and having upward and downward motion with respect to the supporting member; a pneumatic cylinder and piston interposed between said members for imparting upward and downward motion to the supported member; rotatable article-engaging means on said supported member adapted to support an article with the axis of the article substantially on the axis of rotation of the article-engaging means; a pneumatic motor carried by said supported member for rotating said article-engaging means about said axis of rotation continuously with respect to said supporting member as long as gas under pressure is supplied thereto; supply means for supplying a gas under pressure to said cylinder; a port in a wall of said cylinder located to be controlled by a portion of said piston so as to be in communication with the gas in the cylinder only in a predetermined position of the piston therein; conduit means connecting said port with said pneumatic motor; and means independent of said conduit means for discharging gas from said pneumatic motor whereby gas is supplied to said pneumatic motor from said supply means through the cylinder and port and said article-engaging means is rotated as long as said piston is in said predetermined position.

2. The device according to claim 1 wherein the supported member is secured against rotation with respect to the supporting member and the article-engaging means is rotatable with respect to the supported member.

3. A pneumatic article lifting and turning device comprising, in combination: a stationary cylinder; a piston in said cylinder; a supported member mounted for reciprocation with said piston; a rotor on said supported member and rotatable with respect thereto; a pneumatic motor on said supported member for applying a torque between said supported member and rotor and rotating said rotor; article-engaging means on said rotor; means for supplying gas under pressure to said cylinder at one face of the piston; conduit means for supplying gas under pressure to said motor; and valve means in said conduit means controlled by the position of said piston for admitting gas to said motor only at a predetermined position of the piston.

4. A pneumatic article lifting and turning device comprising, in combination: a stationary cylinder having a closed lower end; a piston in said cylinder having a piston rod extending from the upper end of the cylinder; a vertically movable supported member connected to said piston and constrained against rotary motion; a rotor on said supported member for rotation about a vertical axis; article-engaging means on said rotor located so that the vertical axis of a supported article is located substantially at said vertical axis; a pneumatic motor mounted for applying a torque between said supported member and rotor and rotating said rotor and article-engaging means continuously whenever gas under pressure is supplied thereto; means for supplying gas under pressure to the said lower end of the cylinder; means for venting gas from said lower end of the cylinder; a port in the side of said cylinder adapted to be placed into communication with said lower end when the piston is in a raised position; and conduit means connected to said port for supplying gas under pressure from said cylinder to said pneumatic motor.

5. A pneumatic article lifting and turning device comprising, in combination: a stationary cylinder having a closed lower end; a piston in said cylinder having a piston rod extending from the upper end of the cylinder; a vertically movable supported member connected to said piston and constrained against rotary motion; a rotor on said supported member beneath said cylinder for rotation about a vertical axis; a dependent article-engaging member on said rotor located substantially at said vertical axis; a pneumatic motor on said supported member for applying a torque between said supported member and rotor and rotating said rotor and article-engaging member continuously whenever gas under pressure is supplied thereto; means for supplying gas under pressure to the said end of the cylinder; means for venting gas from said lower end of the cylinder; a port in the side of said cylinder adapted to be placed into communication with said lower end when the piston is in a raised position; and flexible conduit means connected to said port and to said pneumatic motor for supplying gas under pressure from said cylinder to said pneumatic motor.

HENRY V. SAX.
HOWARD V. DRESSLER.

References Cited in the file of this patent

UNITED STATES PATENTS

| Number | Name | Date |
|---|---|---|
| 120,275 | Havemeyer | Oct. 24, 1871 |
| 423,548 | Boyer | Mar. 18, 1890 |
| 549,809 | Mesta | Nov. 12, 1895 |
| 2,488,107 | Abegg | Nov. 15, 1949 |

FOREIGN PATENTS

| Number | Country | Date |
|---|---|---|
| 387,399 | Great Britain | Feb. 9, 1933 |